US005757309A

United States Patent [19]
Brooks et al.

[11] Patent Number: 5,757,309
[45] Date of Patent: May 26, 1998

[54] SPATIAL FREQUENCY FEATURE EXTRACTION FOR A CLASSIFICATION SYSTEM USING WAVELETS

[75] Inventors: Harold Aurelius Brooks, Alexandria, Va.; Duane Roth; David Leslie Reade, both of Ridgecrest, Calif.

[73] Assignee: The United States of America as represented by the Secretary of the Navy, Washington, D.C.

[21] Appl. No.: 769,721

[22] Filed: Dec. 18, 1996

[51] Int. Cl.$^6$ ..................................................... G01S 7/292
[52] U.S. Cl. ........................ 342/90; 342/135; 342/192; 342/193; 342/196; 364/485; 364/726
[58] Field of Search ........................ 342/64, 90, 135, 342/192, 193, 194, 195, 196; 364/485, 728.01, 486, 484, 421, 422, 724.12, 728.03, 487, 726

[56] References Cited

U.S. PATENT DOCUMENTS

| | | | |
|---|---|---|---|
| 5,124,930 | 6/1992 | Nicolas et al. | 364/485 |
| 5,481,269 | 1/1996 | Imhoff et al. | 342/90 |
| 5,561,431 | 10/1996 | Peele et al. | 342/90 |

*Primary Examiner*—John B. Sotomayor
*Attorney, Agent, or Firm*—Melvin J. Sliwka; David S. Kalmbaugh; Harvey Gilbert

[57] ABSTRACT

An iterative process to determine the wavelet function and combination of scales of the function which provides data where there is a large separability compared to the separability of the data set prior to processing. Wavelets are selected for inclusion in a library in accordance with predetermined criteria and then applied to a digitized signal by convolution to perform digital filtering. The convolution of each wavelet is performed for the number of times dictated by the coefficients of the wavelet for each of the input signal samples. Separability of the wavelet implemented digital filtration is calculated as a percentage for each wavelet. The separation data is stored in memory until the iterative process is applied to all wavelets. The separability data is then examined to identify the wavelet producing the greatest separation. The data separability is estimated using a likelihood ratio after the probability densities for each of two sets of profile data are estimated. The lower and upper bounds for a Bayes error are determined using resubstitution (R) and leave one out (L) methods, respectively.

10 Claims, 5 Drawing Sheets

SPATIAL FREQUENCY FEATURE EXTRACTION FOR A CLASSIFICATION SYSTEM USING WAVELETS

BACKGROUND OF THE INVENTION

1. Field of the Invention

The present invention relates generally to feature extraction from an image for classification purposes. In particular, the present invention relates to feature extraction based on spatial frequency using wavelets.

2. Description of the Prior Art

The problem addressed by the present invention relates to feature extraction based on spatial frequency content for a statistical pattern recognition system. There is a need to reduce the dimensionality and to remove ambiguities, such as noise, in the data to be classified while maintaining the separability of the data set. Extracting features based on frequency involves a tradeoff between resolution in the time or space domain and resolution of the power spectral density estimate of the original signature. The power spectral density estimate is an indication of the frequency distribution in the signature. Another issue to be considered in the feature extraction process is the amount of required computation time.

The prior art technology consists of using orthogonal transforms such as the Fourier Transform and conventional digital filtering techniques (Finite Impulse Response (FIR) or Infinite Impulse Response (IIR)) to extract the frequency information. The discrete wavelet transform offers a tradeoff between spatial and frequency resolution that is desirable in problems such as feature extraction. The Fourier Transform and digital filtering techniques have a "fixed" resolution tradeoff regardless of the frequency content of the original signature.

The wavelet transform, however, has short basis functions to detect the high frequency band and long basis functions to detect the low frequency band. This unique characteristic of the wavelet transform allows for noise removal and a reduction in dimensionality of the original signature that is superior to that of classical transform and filtering techniques for many applications.

Although there are many applications which would benefit from improvement in spatial frequency feature extraction, the present invention has during testing shown improvements possible in the design of a ship classification system using high resolution radar range profiles. It has been shown that wavelet processing has maintained more separability than the Fourier Transform has for a data set consisting of high resolution radar returns from two separate ships.

The first step in the method is to preselect a set of filters having the characteristics desired for the particular application, each filter defined by a particular wavelet function. For the purposes of the present invention it is required that filter action maximize the amount of separability while minimizing processing time. There are many tradeoffs to address and a considerable body of open literature available describing these tradeoffs. For example, and in relation to the present invention, in applications involving ship images obtained from radar profiles the following wavelet was considered for the reasons set forth:

$Wavelet_1$ = Daubechies wavelet with the following four coefficients: 0.48296291, 0.8365163, 0.22414386, −0.1294095.

The reasons are set forth as follows: A small number of coefficients are required for computational efficiency, time localization and orthogonal filter.

The above is exemplary only and should not be deemed limiting our invention in any way.

SUMMARY OF THE INVENTION

It is thus an object of the present invention to provide a means for extracting features from an input signal to permit reliable classification of data.

It is yet another object of the invention to provide a means for extracting as few features from an input signal as needed to permit reliable and repeatable classification of the target represented by such signal.

It is still another object of the present invention to provide a means for extracting features of input signals to permit differentiation between them by determining and maximizing the separability between the filtered input signal data.

It is finally another object of the present invention to provide a means for maintaining an improved level of separability between data elements in a data set consisting of data from two separate sources such as high-resolution radar returns from two separate targets consisting of, for example ships or aircraft, simultaneously illuminated by a radar or other illumination source.

These and other objects of the present invention are satisfied by an apparatus and method for performing spatial frequency feature extraction using wavelets in order to implement a classification system.

The present invention comprises an iterative process to determine the appropriate wavelet function and combination of scales of this function that provide data in which there is a large amount of separability compared to the separability of the data set prior to the wavelet processing. The amount of separability between the input data sets is determined and compared to a pre-established criterion. If the criterion is not met the process continues until the criterion is met.

The invention requires the creation of a library of preselected wavelet functions, hereinafter referred to as wavelets. Wavelets are selected for inclusion in the library in accordance with criteria dictated by the particular application.

The shapes and numbers of coefficients of the wavelets are selected to produce the filtration of input data to provide computational efficiency and data separability consistent with the feature extraction demands of the application. After input signal digitization wavelets from the library are applied to the digitized signal by convolution digitally to perform digital filtering. The convolution of each wavelet is performed for the number of times dictated by the coefficients of that wavelet for each of the input signal samples, where the number of samples is a function of the scales selected by the analyst. The scales are chosen to obtain the levels of resolution desired and consistent with the quantity of data available to support the choice. Each scale has a resolution that is one-half that of the previous scale. The greater the number of samples, the finer the resolution. The fewer the number of samples, the coarser the resolution. Each wavelet is applied at each scale and coefficient to each set of input data. Separability of the resultant wavelet implemented digital filtration is determined for each of the scales of filtration. Separability is calculated as a percentage for each wavelet. The separation data is stored in memory until all wavelets have been applied in the iterative process of the present invention.

When all wavelets have been applied, the separability data is examined to identify the wavelet producing the greatest separation. The data separability is estimated using the likelihood ratio after the probability densities for each of the two sets of profile data are estimated. The lower and upper bounds for the Bayes error are determined using the resubstitution (R) and the leave one out (L) methods, respectively.

An appreciation of the objectives of the present invention and a more complete understanding of its structure and method of operation may be had by studying the following description of the preferred embodiment and by referring to the accompanying drawings.

DETAILED DESCRIPTION OF THE PREFERRED EMBODIMENT

The present invention is a method and an apparatus for implementing the method for extracting spatial frequency features from an analog profile or signature information produced by a target, either directly or by reflection. The present invention extracts features in a manner that optimizes the separability of the data processed so that multiple targets simultaneously present in the data are easily distinguished.

Figure 1:
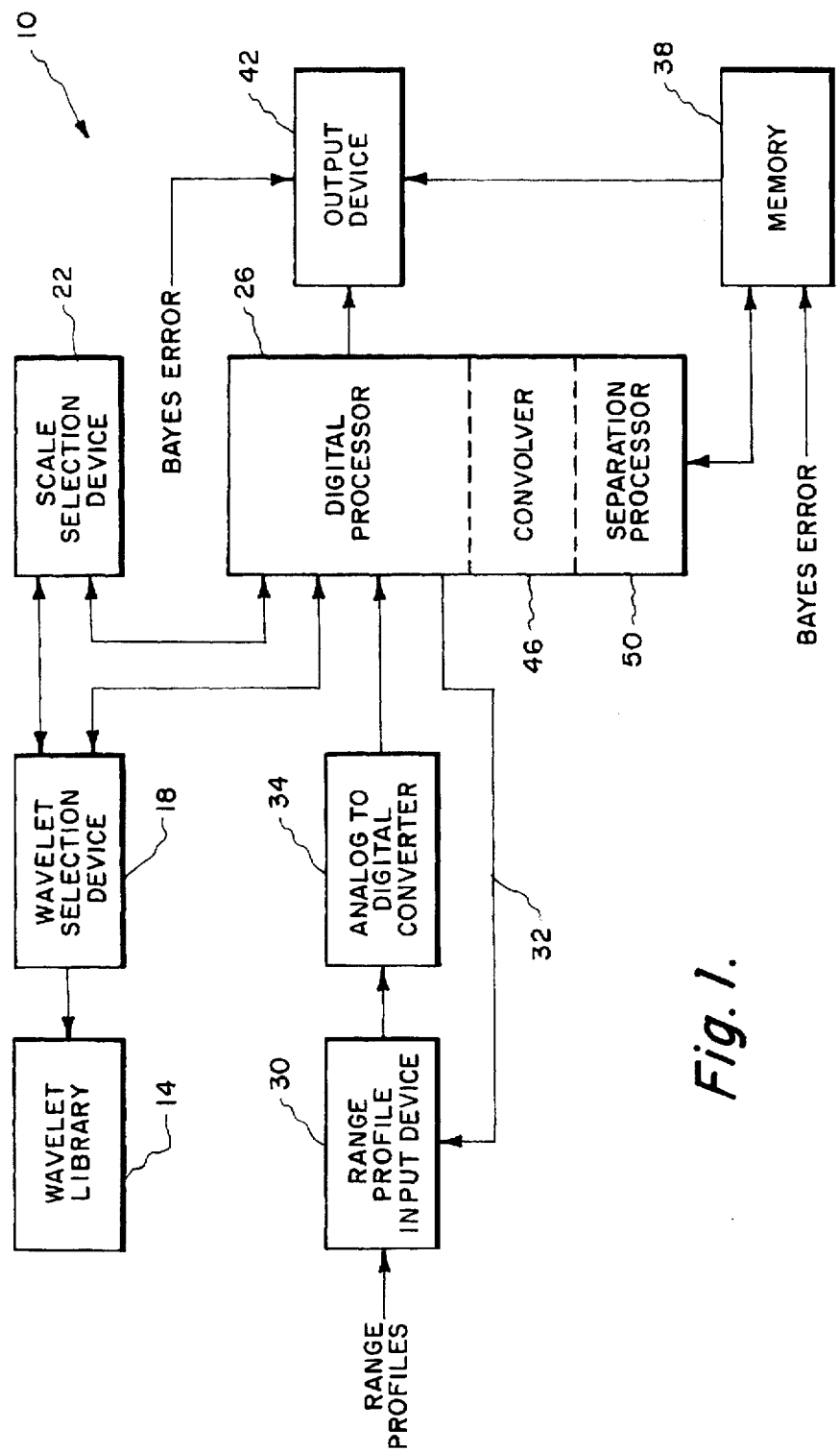
FIG. 1 is a functional block diagram of the present invention.

Referring now to FIG. 1, this figure depicts the apparatus of the present invention as well as the methodology involved. In FIG. 1 the feature extraction apparatus 10 of the present invention is shown to comprise a preassembled wavelet library 14 of a type selected for inclusion on the basis of general inclusion criteria. General inclusion criteria includes consideration of the type of data to be operated upon. Ship, aircraft, ground vehicle, noise content and other factors relating to the application data are considered. The wavelet selection device 18 may be, for example, a keyboard or a computer program subroutine connected to communicate with and between itself and the wavelet library 14 and the digital processor 26. A scale selection device 22 can likewise be one of several means for communicating scale selection for each wavelet selected to the digital processor 26. Thus, a keyboard or digital means such as a computer subroutine may be used to provide the appropriate scale inputs consistent with the wavelet selected.

The range profile input device 30 may be a radar receiver or an analog signal storage means. The range profile input 30 is connected to the analog to digital (A/D) converter 34 for digitizing the analog input signal from the range profile input device 30. The digital output of digital processor 26 is connected to an output device 42 which may be a video display, a printer, or a combination of output devices. Digital processor 26 is connected to communicate with a memory 38 which may be internal or external to digital processor 26 or a combination of both internal and external memory as applications environments, and weight and space limitations of a host vehicle dictate. Digital processor 26 also connects to range profile input device 30 via a connecting link 32. A convolver 46 and a separation processor 50 are internal to digital processor 26. Memory 38 is connected to output device 42.

Figure 2:
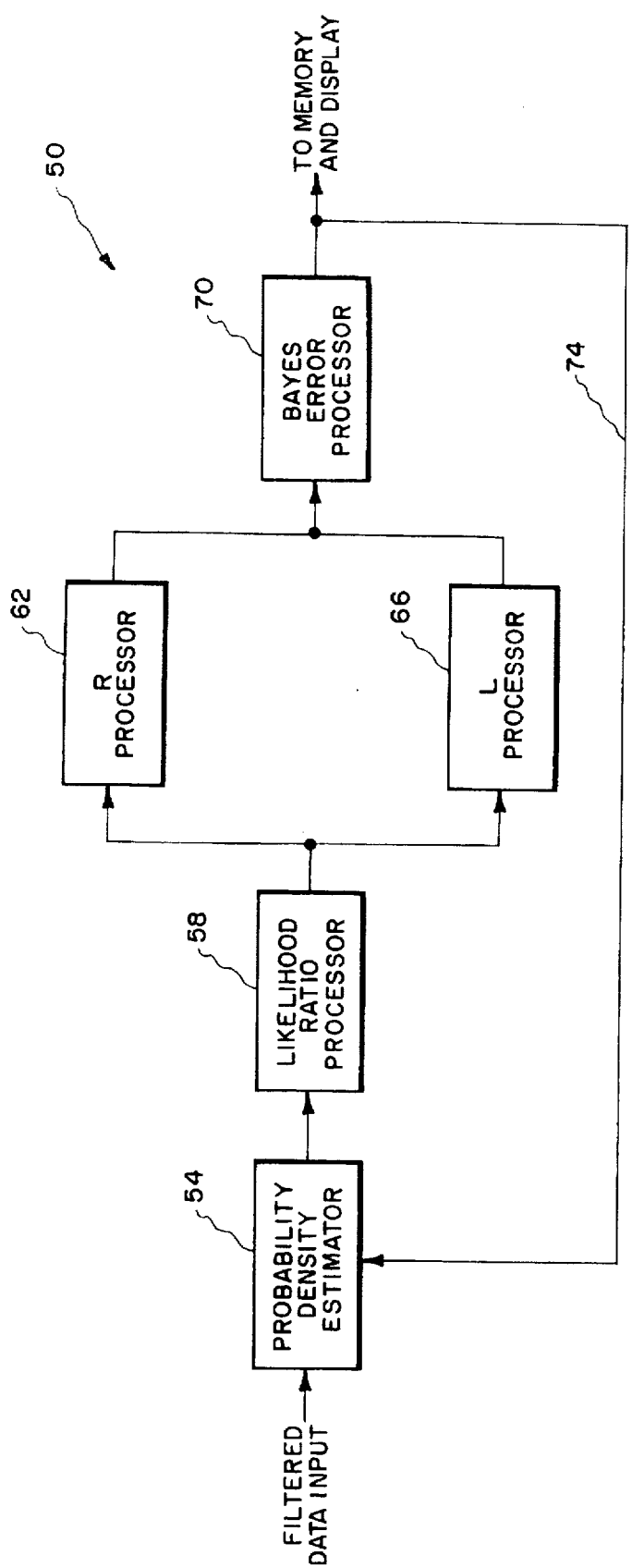
FIG. 2 is a functional block diagram of the data separation portion of the present invention.

Referring to FIGS. 1 and 2, FIG. 2 depicts the data separation processor 50 of FIG. 1 which is depicted as being located within digital processor 26. Data separation processor 50 comprises a probability density estimator 54 which is connected to receive wavelet-filtered input data from convolver 46 in digital processor 26 and to provide its output to a likelihood ratio processor 58. The output of likelihood ratio processor 58 is connected to a resubstitution (R) processor 62 and a leave-one-out (L) processor 66 which are in parallel with each other. The outputs of R processor 62 and L processor 66 are connected to a Bayes error processor 70 which is connected to provide its output to memory 38 (FIG. 1) and output device 42 (FIG. 1).

OPERATION OF THE PRESENT INVENTION

Referring to FIGS. 1 and 2, feature extraction apparatus 10 requires the preparation of the wavelet library 14. Wavelet functions selected for the particular type of data to be processed and the data separation desired are obtained from sources such as Daubechies, as discussed below. The wavelet shapes, coefficients, and the scales at which they are to be applied to the number of samples of input data are considered. Computational efficiency is a consideration when real versus non-realtime operation is important. In addition, the following considerations and others in the literature guide the user of the present invention in selecting the wavelets for inclusion in library 14. How much and what kind of information can be acceptably filtered out? What information must survive the filtering process and be maintained?

By way of example and as used in one preferred embodiment of the present invention, wavelets were selected from those identified by Ingrid Daubechies in her paper titled "Orthonormal Bases of Compactly Supported Wavelets" from Communications on Pure and Applied Mathematics, Vol. XII, 909,996 (1988) John Wiley and Sons, Inc.. An Example of a wavelet included in library 14 of the present invention is:

a. a Daubechies wavelet with the following coefficients: 0.48296291, 0.8365163, 0.22414386, —0.1294095.

b. The Daubechies wavelet was selected for inclusion for the following reasons (in relation to selection criteria): A small number of coefficients are required for computational efficiency, time localization and orthogonal filter.

For an embodiment of the present invention applied to two sets of ship profile data which was input from analog radar receivers and having approximately 1500 data points per set, library 14 was created with Daubechies wavelets having coefficients of 2, 6, 8 and 10.

To initiate processing by the present invention range profile data in analog form is obtained by range profile input 30 which may be a radar receiver providing direct input or an analog storage device containing data received from a receiver of some type. The analog input is digitized by analog to digital converter 34 and the digital data is input to digital processor 26.

The present invention requires that the user initiate wavelet selection via wavelet selection device 18 calling for a particular wavelet from wavelet library 14. The wavelet selection device 18 may be a keyboard, a preprogrammed digital device or a computer subroutine called directly or indirectly by the user. The user also initiates scale selection device 22 so that the appropriate first scale, and those following in order, serially or in parallel are forwarded to digital processor 26 for use with the first selected wavelet.

Digital processor 26 operates on the incoming digitalized profile data in each of the two sets. In the preferred embodiment, the two sets of ship profiles contained approximately 1500 profiles each. The digital processor 26 performs a wavelet transform with the selected wavelet at each of the scales selected on each of the data samples from each profile in each target set. The transform process is convolution. The waveform convolutions with each profile data sample produces in effect a filtered result for each of the scales used for each selected wavelet. Thus, for a coefficient of 2 the number of data points to which the wavelet transform is applied was 128, for a coefficient of 6 the number of data points was 64, for a coefficient of 8 the number of data points was 32, and for a coefficient of 10 the number of data points was 16. The wavelet transform comprising the convolution of wavelet values at the coefficient points with each of the data samples of the input data signal is a filtering operation for which the output is numerous versions of the filtered original signal at different resolutions. Each version of the original signal has a resolution that is one-half of the previous version. Each version is commonly referred to as a scale. The user can choose any number of scales for the wavelet transform if there is enough data to support the choice. The transform for one wavelet at one scale is performed on the profile or signature data in each of the two sets representing individually two separate targets.

After completion of the convolution filtering, the filtered data for each scale is operated upon by separation processor 50. The filtered data is input to the probability density estimator 54 for each of the two sets of data being operated upon. The probability density is estimated using a nonparametric K Nearest Neighbor (KNN) estimator. This estimator appears as a computer software subroutine in Appendix A. The KNN density estimate is a non-parametric estimation technique in which the probability density is estimated locally by a small number of neighboring samples in a potentially high-dimensional space. The volume from which the samples are drawn in obtaining this estimate is inversely proportional to the density within the volume. The equation for the KNN density estimate is as follows:

$$P(X) = \frac{k-1}{N*V(X,k)} \quad (1)$$

where,

X= the location at which the density function is estimated.

V(X,k)= the hyperspherical volume of the local region surrounding X, which encompasses all k nearest neighbors.

N= the total number of samples drawn.

k= the total number of samples that are within the volume V(X,k).

After the probability density is estimated for each data set the likelihood ratio classification of the data is performed by the likelihood ratio processor 58. The likelihood ratio is a ratio of one probability density to another and is used to develop an optimal classification given a known probability density function. In the present invention the objective is to quickly find and apply the best of the pre-selected wavelets to permit digital wavelet filtration of two sets of data to achieve maximum separation of that data. Thus, for each wavelet applied to the two sets of data an estimate of the separability is obtained based on the likelihood ratio.

Figure 4:
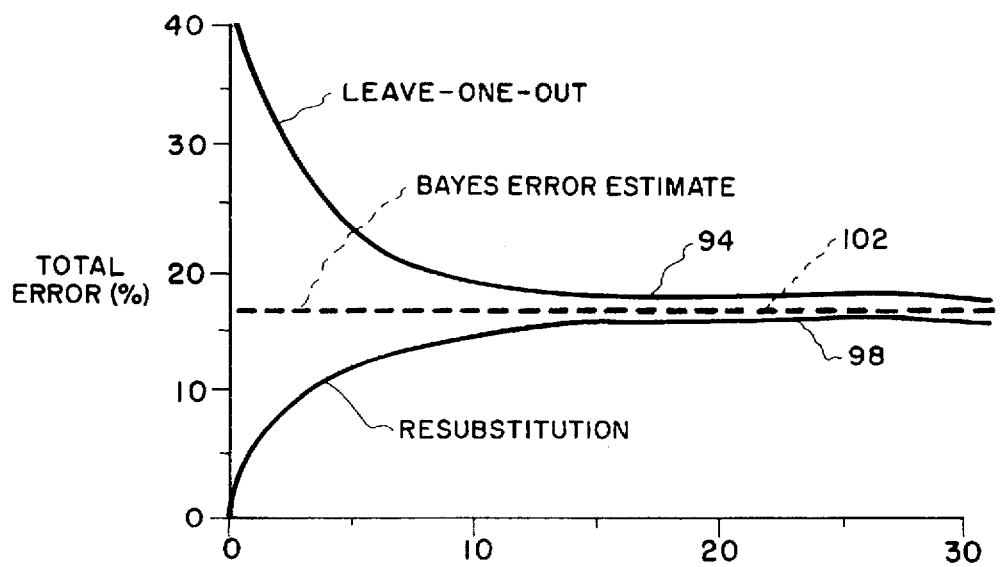
FIG. 4 is a KNN plot used for deriving a Bayes error estimate.

The likelihood ratio data is next sent to the resubstitution (R) processor 62 and the leave-one-out (L) processor 66 for controlled input to the Bayes error processor 70. The upper and lower bounds for the Bayes error calculation is thus determined using the resubstitution (R) and leave-one-out (L) methods, respectively. The results of this processing of the two data sets is depicted in FIG.4 where the leave-one-out plot 94 and resubstitution plot 98 are graphically depicted asymptotically approaching the graphic representation (plot) 102 representing the Bayes error for the separability of the two data sets filtered by one wavelet at one scale.

Figure 3A:
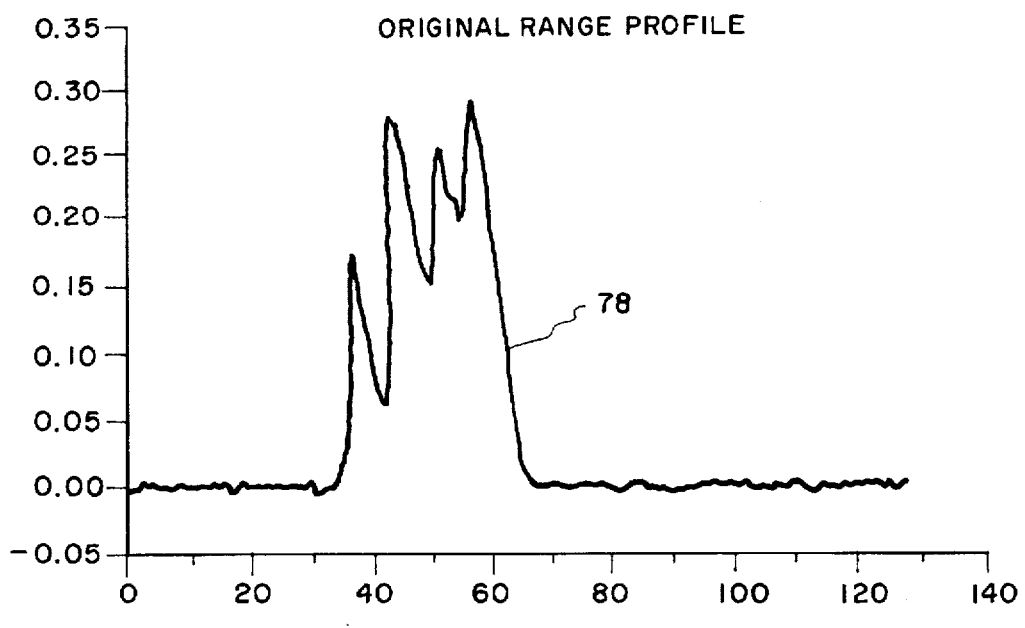
FIGS. 3A, 3B, 3C and 3D are a series of range profiles including those wavelets processed for multiresolution results.
Figure 3B:
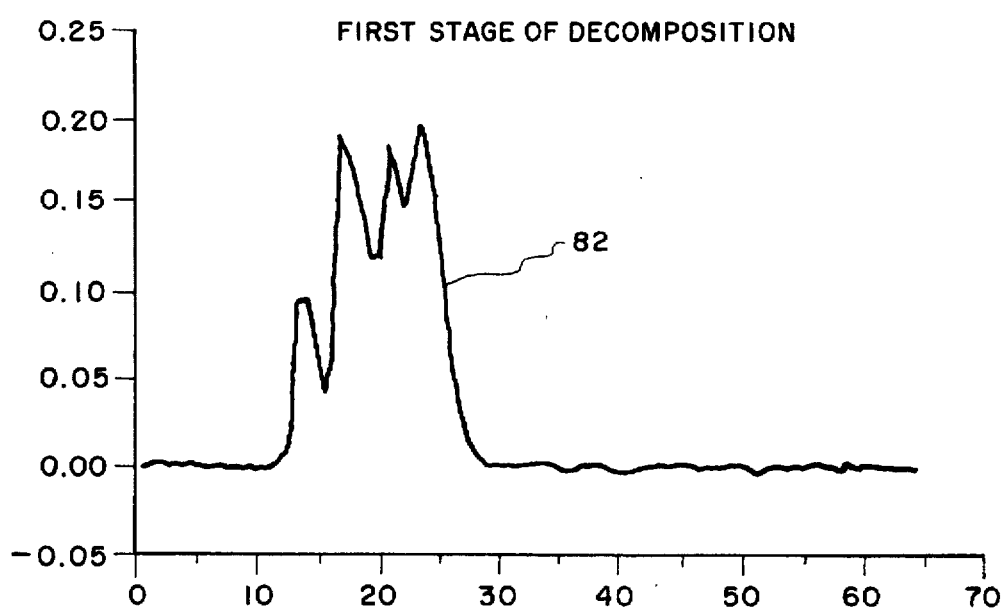
Figure 3C:
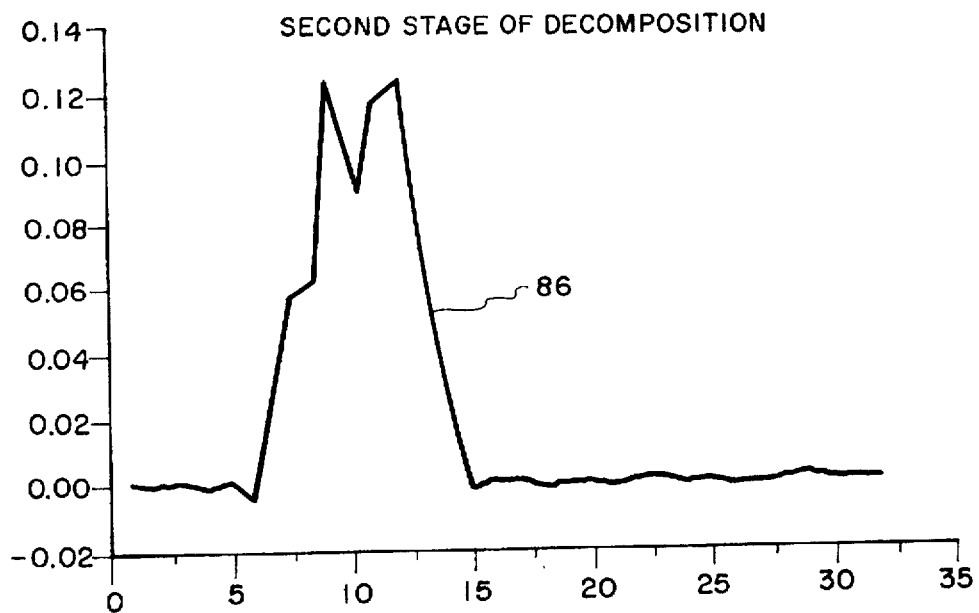
Figure 3D:
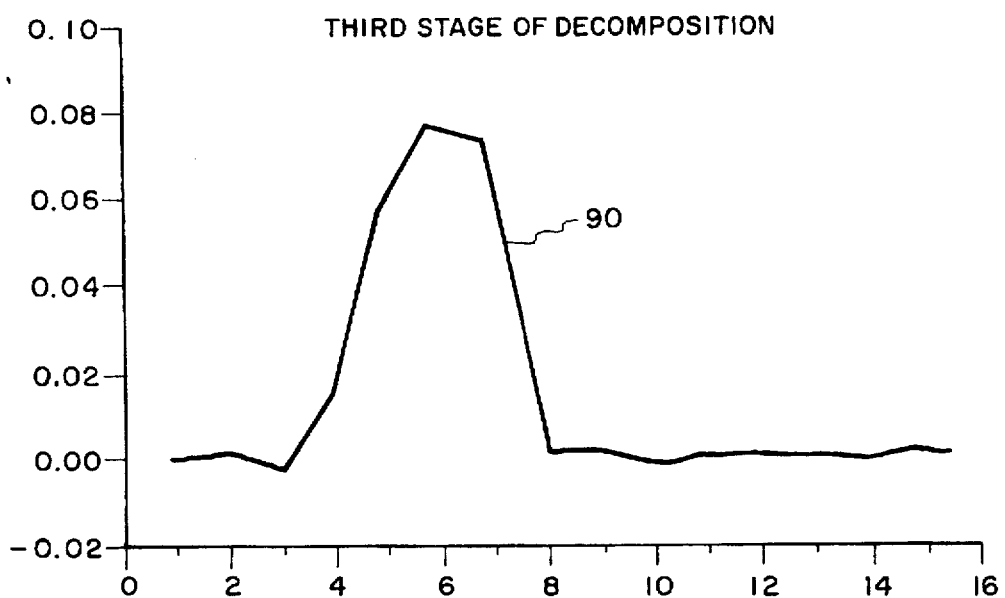
Figure 5:
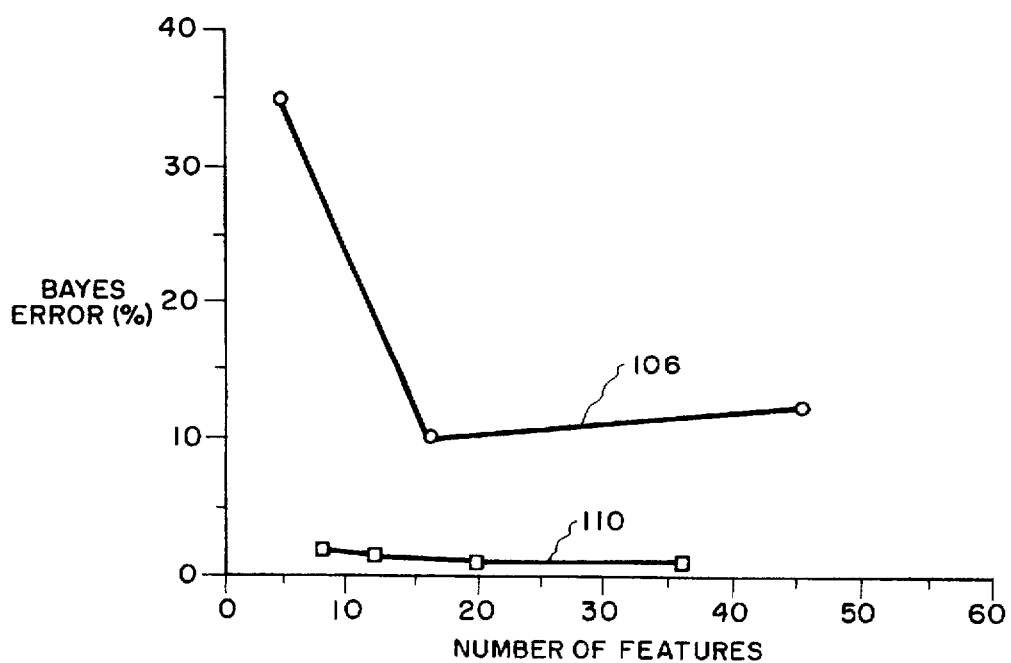
FIG. 5 is a comparative plot of Bayes error versus number of features for two classes of range-only-radar target profiles for wavelet and PSD processing.

Using the present invention method implemented and mechanized by the apparatus of the invention, the results of using the discrete wavelet transform for feature extraction for an actual Range-Only-Radar (ROR) ship classification problem is illustrated in FIG. 5. Approximately 1500 range profiles for each of two different ships were used in testing the performance of the wavelet transform for feature extraction. As described previously, the range profiles were fed into the feature extraction apparatus 10, the wavelet transform applied, a KNN probability density estimation process performed, and a Bayes error estimation obtained in separation processor 50. FIGS. 3b, 3c and 3d illustrate three stages of range profile decomposition for the range profile of FIG. 3a using the present invention. FIG. 4 shows the plot of the output of the L and R processors for different values of K. FIG. 5 shows how the Bayes error is dependent on the number of features used in a classification system using the wavelet technique of the present invention versus a Fourier transform. The separability of two classes is inversely proportional to the Bayes error. It is noted from FIG. 5 that the performance of the wavelet transform 106 using the present invention is far superior to that obtained using the Fourier transform 110 approach.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

Navy Case No. 75539

Appendix A

```
      Program K_NN_Distances
c
c  **********************************************************************
c  *                                                                    *
c  *  This program computes the K_NN distances for every sample in a file *
c  *  to the other samples in the same file. Both within class and between *
c  *  class. The samples are first transformed into a reduced dimensional *
c  *  decision space.                                                    *
c  *                                                                    *
c  *  Author: David L. Reade (Code 3158 NWC)                            *
c  *  Date: 5/7/88                                                      *
c  *                                                                    *
c  **********************************************************************
      Implicit None
      include 'clanatr_parameters.def'
      include 'knn_global.def'
      include 'k_nn_def.inc' c     access the section file:
      print*,"started knn"
      call access_section_file print *, 'User Input Parameters:'
      print '(a,a)', '              Log type:       ', log-type
      print '(a,a)', '   File name identifier:      ', file_name_identfier
      print '(a,a)', '        Input CC file name:   ', input_cc_file_name
      print '(a,a)', '      Input data file name:   ', k_nn_tp_file_name
      print '(a,a)', '           MUKNN file name:   ', muknn_file_name
      print '(a,a)', '        K NN TP file name:    ', k_nn_tp_file_name
      print '(a,a)', '             DNN file name:   ', DNN_file_name
      print '(a,a)', '             RNK file name:   ', rnk_file_name
      print '(a,a)', '   Training data file name:
     :                           training data file name
      print '(a, i4)','                        K:   ', k
      print '(a, i4)','                    UDFTS:   ',
      print '(a, i4)','  Separate data files flag:  ',
     :                           separate_data_files
      print '(a, i4)','        Normalization type:  ', normalization_ty
     : pe
      print '(a, i4)','             L-1-o method:   ', llo_method
c
c  **********************************************************************
c  *                                                                    *
c  *  This next section reads in the training parameters computed from  *
c  *  'Noxfrm','SMPLX','PDA', or 'NPDA'.                                *
c  *                                                                    *
c  **********************************************************************
c
              Call Read_TP_Parms
              Call Read_CC_Matrices
```

Navy Case No. 75539

```
C
C ************************************************************************
C *                                                                      *
C * This routine computes the means of the 'K' NN's as defined here:     *
C *           K               K    j                                     *
C *           M (X ) = (1/K)(Sum XNN  )                                  *
C *            i  1          j=1   i1                                    *
C *   Where:  XNN  = the jth NN from the ith class to Unnormalized       *
C *              i1                                                      *
C *                  sample X                                            *
C *                         1                                            *
C *                                                                      *
C ************************************************************************
C
        Call Load_Design_Set
        Call Load_Test_Set
        Call K_NN_Computations
      End
C
$alias sysread = 'read'  (%val, %ref, %val)
      Subroutine Inquire_Recl (File_Name,Rec_Len)
C    Warning!! this routine assumes the file was created as
C    an unformatted file and all records are the same length.
C
      character*(*) File_Name
      integer*4     Rec_Len
      integer*4     filedes,fnum Open( Unit = 89,
     :      Status = 'OLD',
     :      File = File_Name,
     :      Form = 'FORMATTED',
     :      READONLY)
      filedes = FNUM(89)
      call sysread(filedes, Rec_Len,4)
      close (89)
      Return
      End Subroutine Read_Tp_Parms C
C ************************************************************************
C *                                                                      *
C *   This routine is designed to read training parameters for the from one *
C *   of 4 types of training parameter files.                            *
C *                                                                      *
C *   Author: David L. Reade (Code 3158 NWC)                             *
C *   Date: 6/8/88                                                       *
C *                                                                      *
C ************************************************************************
C
      Implicit None
      include 'clanatr_parameters.def'
      include 'knn_global.def'
      include 'k_nn_def.inc'
C
```

27

Navy Case No. 75539

```
      Integer*4      ijk
      Integer*4      kji
      Integer*4      Kndx
      Integer*4      Lndx
      Integer*4      Indx
c
c****** Open the output Training parameter file
c
      Open(    Unit = Lutp,
     :         File = K_NN_TP_File_Name,
     :         Status = 'OLD',
     :         Access = 'SEQUENTIAL',
     :         Form = 'UNFORMATTED')

If (Tp_Type .eq. 0) Then
            Read (Lutp) Noxfrm_Node_Def
            Node_Def.Xform_Type          = Noxfrm_Node_Def.Xform_Type
            Node_Def.N_Classes           = Noxfrm_Node_Def.N_Classes
            Node_Def.FV_Dim              = Noxfrm_Node_Def.FV_Dim
            Node_Def.Nwts                = Noxfrm_Node_Def.Nwts
            Node_Def.Deg                 = Noxfrm_Node_Def.Deg
            Node_Def.Nfts                = Noxfrm_Node_Def.FV_Dim
            Node_Def.Bypass_Normalization = Normalization_type .eq. 3
            Do Indx = 1, Node_Def.FV_Dim
                  Node_Def.FV_Selected_Features(Indx) = Noxfrm_Node_Def.
     :  Selected_Features(Indx)
            End Do
            if ( log_type .eq. 'max ') then
12          format( 1x, a, i4)
                        print *, ' '
                        print *, '(Input) Training Parameters'
                        print 12, '    transform type:   ', node_def.xfor
     :  m_type
                        print 12, ' number of classes:   ', node_def.n_cl
     :  asses
                        print 12, 'number of features:   ', node_def.fv_d
     :  im
                        print 12, ' number of weights:   ', node_def.nwts
                        print 12, '               deg:   ', node_def.deg
                        print 12, '              nfts:   ', node_def.nfts
                        print 12, '           SB rank:   ', node_ def.sb_r
     :  ank
                        print '( 1x, a, 2x, 12( i3, 2x))',
     :              ' selected features:',
     :              (node_def.fv_selected_features( indx),
     :                    indx = 1, node_def.fv_dim)

end if
      Else If (Tp_Type .eq. 1) Then
            Read (Lutp) Smplx_Node_Def
            Node_Def.Xform_Type          = Smplx_Node_Def.Xform_Type
            Node_Def.N_Classes           = Smplx_Node_Def.N_Classes
            Node_Def.FV_Dim              = Smplx_Node_Def.FV_Dim
            Node_Def.Nwts                = Smplx_Node_Def.Nwts
            Node_Def.Deg                 = Smplx_Node_Def.Deg
            Node_Def.Nfts                = Node_Def.N_Classes-1
            Node_Def.Bypass_Normalization = Normalization_type .eq. 3
```

28

Navy Case No. 75539

```
        Do Indx = 1, Node_Def.FV_Dim
            Node_Def.FV_Selected_Features(Indx) = Smplx_Node_Def.S
    : elected_Features(Indx)
        End Do
      Else If (Tp_Type .eq. 2) Then
        Read (Lutp) PDA_Node_Def
        Node_Def.Xform_Type              = PDA_Node_Def.Xform_Type
        Node_Def.N_Classes               = PDA_Node_Def.N_Classes
        Node_Def.F_Dim                   = PDA_Node_Def.FV_Dim
        Node_Def.Nwts                    = PDA_Node_Def.Nwts
        Node_Def.Deg                     = PDA_Node_Def.Deg
        Node_Def.Nfts                    = Node_Def.N_Classes-1
        Node_Def.SB_Rank                 = PDA_Node_Def.SB_Rank
        Node_Def.Bypass_Normalization    = Normalization_type .eq. 3
        Do Indx = 1, Node_Def.FV_Dim
            Node_Def.FV_Selected_Features(Indx) = PDA_Node_Def.Sel
    : ected_Features(Indx)
        End Do
      Else If (Tp_Type .eq. 3) Then
        Read (Lutp) NPDA_Node_Def
        Node_Def.Xform_Type              = NPDA_Node_Def.Xform_Type
        Node_Def.N_Classes               = NPDA_Node_Def.N_Classes
        Node_Def.FV_Dim                  = NPDA_Node_Def.FV_Dim
        Node_Def.Nwts                    = NPDA_Node_Def.Nwts
        Node_Def.Deg                     = NPDA_Node_Def.Deg
        Node_Def.Nfts                    = Node_Def.Nwts
        Node_Def.K_Parm                  = NPDA_Node_Def.K_Parm
        Node_Def.K_Alpha                 = NPDA_Node_Def.K_Alpha
        Node_Def.SB_Rank                 = NPDA_Node_Def.SB_Rank
        Node_Def.Bypass_Normalization    = Normalization_type .eq. 3
        Do Indx = 1, Node_Def.FV_Dim
            Node_Def.FV_Selected_Features(Indx) = NPDA_Node_Def.Se
    : lected_Features(Indx)
        End Do
      End If
c
c****** Read the class/class id data
        read( lutp) class_change_list
c
c****** Next Read the feature mean vector
c
        Read (Lutp)(XMN(ijk),ijk=1, Node_Def.FV_Dim)
c
c****** Next Read the feature Standard Deviation vector
c
        Read (Lutp)(XSTD(ijk),ijk=1, Node_Def.FV_Dim)
c
c****** Next Read the feature median vector
c
        Read (Lutp)(X_Median(ijk),ijk=1, Node_Def.FV_Dim)
c
c****** Next Read the feature MAD vector
c
        Read (Lutp)(X_Mad(ijk),ijk=1, Node_Def.FV_Dim)
c
        If (Normalization_Type .eq. 2) Then
            Do Indx = 1, Node_Def.FV_Dim
```

29

Navy Case No. 75539

```
              XMN(Indx) = X_Median(Indx)
              XSTD(Indx) = X_Mad(Indx)
          End Do
       End If
C
C****** Next Read in the global monomial means
C
       Read (Lutp)(MU GBL(ijk),ijk=1, Node_Def.Nwts)
C
C****** Next Read the Transformation matrix [W]
       Do Indx = 1, Node_Def.Nfts
              Read (Lutp)(W(ijk,Indx),ijk=1, Node_Def.Nwts)
       End Do
       Close (Unit=Lutp)
       Return
       End
```

Navy Case No. 75539

```
c
c ***********************************************************************
c *                                                                     *
c *   Read the Class Covariance Matrices and the corresponding diagonal- *
c *   ization matrices.                                                  *
c *                                                                     *
c *   Author: David L. Reade   (Code 3158 NWC)                          *
c *   Date: 9/7/89                                                       *
c *                                                                     *
c ***********************************************************************
c
      Subroutine Read_CC_Matrices
      Implicit None include 'clanatr_parameters.def'
      include 'knn_global.def'
      include 'k_nn_def.inc'

Integer*4        ijk
      Integer*4        kji
      Integer*4        Kndx
      Integer*4        Lndx
      Integer*4        Indx
c
c****** Open the output data file
c
      Rec_Len = Udfts
      Open(    Unit = Lucc,
     :         File = Input_CC_File_Name,
     :         Status = 'OLD',
     :         Access = 'SEQUENTIAL',
     :         Form = 'UNFORMATTED')
c
c*****  Read the Class Means First
c
      Do Kndx = 1, Node_Def.N_Classes
          Read(Lucc)(Class_MU(ijk,Kndx),ijk=1, Udfts)
      End Do
c
c*****  Read the Class_Covariances
c
      Do Kndx = 1, Node_Def.N_Classes
          Do Lndx = 1, Udfts
              Read(Lucc)(CC(ijk,Lndx,Kndx),ijk=1, Udfts)
          End Do
      End Do
c
c*****  Read the diagonalization matrices
c
      do kndx = 1, node_def.n_classes
        do lndx = 1, udfts
             read( lucc)  ( atr (ijk, lndx, kndx), ijk = 1, udfts)
        end do
      end do Close (Unit=Lucc)
      Return
```

31

Navy Case No. 75539

```
      End
      Subroutine Load_Design_Set
c
c ****************************************************************************
c *                                                                          *
c *   This routine preloads the smaller design set into memory so as to      *
c *   speed up the processing time.                                          *
c *                                                                          *
c *   Author: David L. Reade (Code 3158 NWC)                                 *
c *   Date: 5/7/88                                                           *
c *                                                                          *
c ****************************************************************************
c
      Implicit None
      include 'clanatr_parameters.def'
      include 'knn_global.def'
      include 'k_nn_def.inc'
c
c****** Define Local Variables and Arrays
c
      Integer*4       ijk
      Integer*4       kji
      Integer*4       Indx
      Integer*4       Jndx
      Integer*4       Kndx
      Integer*4       Mndx
      Integer*4       nndx
      Integer*4       Lndx
      Integer*4       TID
      Integer*4       Rec_Indx
c
      Logical*1       Eof_Detected
c
c****** Open the training data file
c
      Call Inquire_recl (Input_Data_File_Name, Rec_Len)
      Rec_Len = Rec_Len/4
      If (Seperate_Data_Files) Then
          Open(        Unit = LUN_TR,
     :                 File = Training_Data_File_Name,
     :                 Status = 'OLD',
     :                 Form = 'UNFORMATTED')
      Else
          Open(        Unit = LUN_TR,
     :                 File = Input_Data_File_Name,
     :                 Status = 'OLD',
     :                 Form = 'UNFORMATTED')
      End If
c
      Do Indx = 1 MNC
            Sample_Count(Indx) = 0
      End Do
c
      Lndx = 1
      Eof_Detected = .false.
      Do While (.not. Eof_Detected)
```

Navy Case No. 75539

```
              Read (LUN_TR, Err=10000, End=10000)
                  (R4_Buffer(ijk),ijk=1, Rec_Len)
              TID = R4_Buffer(Rec_Len)
              Rec_Indx = R4_Buffer(Rec_Len-1)
              Sample_Count(TID) = Sample_Count(TID) + 1
              Design_Set_TID(Lndx) = TID
              Design_Set_Indx(Lndx) = Lndx
              Call Selcf (R4_Buffer
     $                   ,XS
     $                   ,Node_Def.FV_Selected_Features
     $                   ,Node_Def.FV_Dim
     $                   )
              Call Fnorm (XS
     $                   ,X
     $                   ,XMN
     $                   ,XSTD
     $                   ,Node_Def.FV_Dim
     $                   ,Node_Def.Bypass_Normalization
     $                   )
              Call General_Monom (Node_Def.FV_Dim
     $                           ,Node_Def.Deg
     $                           , X
     $                           ,MU_GBL
     $                           ,Y
     $                           ,TPWD1
     $                           ,Node_Def.Xform_Type
     $                           ,Node_Def.Nwts
     $                           )
              Do Jndx = 1, Udfts
                  ZZ(Jndx,Lndx) = 0.0
                  Mndx = K_NN_Selected_Features(Jndx)
                  Do Indx = 1, Node_Def.Nwts
                      ZZ(Jndx,Lndx) = ZZ(Jndx,Lndx) + W(Indx,Mndx
     :  )*Y(Indx)
                  End Do
              End Do
              Do Jndx = 1, Udfts
                  BZ(Jndx,Lndx) = 0.0
                  Do Indx = 1, Udfts
                      BZ(Jndx,Lndx) = BZ(Jndx,Lndx) + Atr(Jndx,I
     :  ndx,TID)*ZZ(Indx,Lndx)
                  End Do
              End Do
              Lndx = Lndx + 1
          If (Eof_Detected) Then
10000     Print *,'Completed LOAD DESIGN SET with ',Lndx-1,
     :            ' Records'
          Print *,'Before encountering an EOF condition '
          Eof_Detected = .true.
          End If
      End Do Total_Sample_Count = Lndx - 1
      Close (Unit=LUN_TR)

Return
      End
```

33

Navy Case No. 75539

```
c
c ******************************************************************
c *                                                                  *
c *   This routine preloads the test set and prepares for the quadratic *
c *   metric up front to speed up the processing time.               *
c *                                                                  *
c *   Author: David L. Reade (Code 3158 NWC)                         *
c *   Date: 5/7/88                                                   *
c *                                                                  *
c ******************************************************************
c
      Subroutine Load_Test_Set
      Implicit None include 'clanatr_parameters.def'
         include 'knn_global.def'
         include 'k_nn_def.inc'
c
c******  Define Local Variables and Arrays
c
      Integer*4      ijk
      Integer*4      kji
      Integer*4      Indx
      Integer*4      Jndx
      Integer*4      Kndx
      Integer*4      Mndx
      Integer*4      nndx
      Integer*4      Lndx
      Integer*4      TID
      Integer*4      Rec_Indx
c
      Logical*1      Eof_Detected
c
c******  Open the test data file
c
      OPEN (Unit = LUN,
            File = Input_Data_File_Name,
            Status = 'OLD',
            Form = 'UNFORMATTED')
c
c******  Open the scratch data file
c
      Rec_Len_1 = (Node_Def.N_Classes+1)*Udfts + 2
c
      OPEN (Unit = LU_SCR,
         :      File = Scratch_File_Name,
         :      Status = 'UNKNOWN',
         :      Form = 'UNFORMATTED')
c
c     The following code and the store of the dynamic parameters
c     assumes that the Design set and the Test set are the same file.
c
      Do Indx = 1, MNC
         Sample_Count(Indx) = 0
         End Do
c
      Ln dx = 1
```

Navy Case No. 75539

```
      Eof_Detected = .false.
      Do While (.not. Eof_Detected)
            Read (LUN, Err=10000, End=10000)
   :           (R4_Buffer(ijk),ijk=1, Rec_Len)
            TID = R4_Buffer(Rec_Len)
            Rec_Indx = R4_Buffer(Rec_Len-1)
            Sample_Count(TID) = Sample_Count(TID) + 1
            Call Selcf (R4_Buffer
   $                   ,XS
   $                   ,Node_Def.FV_Selected_Features
   $                   ,Node_Def.FV_Dim
   $                   )
            Call Fnorm (XS
   $                   ,X
   $                   ,XMN
   $                   ,XSTD
   $                   ,Node_Def.FV_Dim
   $                   ,Node_Def.Bypass_Normalization
            Call General_Monom (Node_Def.FV_Dim
   $                           ,Node_Def.Deg
   $                           ,X
   $                           ,MU_GBL
   $                           ,Y
   $                           ,TPWD1
   $                           ,Node_Def.Xform_Type
   $                           ,Node_Def.Nwts
   $                           )
            Do Jndx = 1, Udfts
                  Z(Jndx) = 0.0
                  Mndx = K_NN_Selected_Features(Jndx)
                  Do Indx = 1, Node_Def.Nwts
                        Z(Jndx) = Z(Jndx) + W(Indx,Mndx)*Y(Indx)
                  End Do
            End Do
            Do Kndx = 1, Node_Def.N_Classes
                  Do Jndx = 1, Udfts
                        AZ(Jndx,Kndx) = 0.0
                        Do Indx = 1, Udfts
                              AZ(Jndx,Kndx) = AZ(Jndx,Kndx)
   $                                       + Atr(Jndx,Indx,Kndx)
   :                                       * Z(Indx)
                        End Do
                  End Do
            End Do
            Write (LU_SCR) TID,lndx,(Z(Indx),
   :              Indx=1, Udfts),
   :              ((AZ(Indx,Jndx),Indx=1,Udfts),
   :              Jndx=1,Node_Def.N_Classes)
            Lndx = Lndx + 1
            If (Eof_Detected) Then
10000             Print *,'Completed LOAD TEST SET with ',Lndx-1,
   :                    ' Records'
            Print *,'Before encountering an EOF condition '
            Eof_Detected = .true.
         End If
      End Do
      Close (Unit=LUN)
```

35

Navy Case No. 75539

Return
End

Navy Case No. 75539

```
c
      Subroutine K NN Computations
c ***********************************************************************
c *                                                                      *
c *    This Routine computes the 'K' Nearest Nieghbors of each           *
c *    data sample set both within class and across classes. The search  *
c *    is conducted over the entire data set. The data used here is      *
c *    Normalized data.                                                  *
c *                                                                      *
c *    Author: David L. Reade (Code 3158 NWC)                            *
c *    Date: 5/7/88                                                      *
c *                                                                      *
c ***********************************************************************
c
      Implicit None
      include 'clanatr_parameters.def'
      include 'knn_global.def'
      include 'k_nn_def.inc'
c
c******  Define Local Variables and Arrays
c
      Integer*4    ijk
      Integer*4    kjl
      Integer*4    iidx
      Integer*4    Indx
      Integer*4    jjdx
      Integer*4    Jndx
      Integer*4    Kndx
      Integer*4    Mndx
      Integer*4    nndx
      Integer*4    Lndx
      Integer*4    TID_1
      Integer*4    TID_2
      Integer*4    N_Samples
      Integer*4    Rec_Indx_1
      Integer*4    Rec_Indx_2
      Integer*4    Sample_Histo(MNC)
c
      Real*4       NN_D
      Real*4       DZ
      Real*4       Tmp_Val
c
      Logical*1    Eof_Detected
c
c******  Open the distance and rank files for the Normalized data
c
      DNN_Rec_Len = (K+1)*Node_Def.N_Classes
      Open (Unit=LU_DNN, File = DNN_File_Name, Status = 'NEW')
c
      Rnk_Rec_Len = (K+1)*Node_Def.N_Classes/2
      Open (Unit=LU_Rnk, File = Rnk_File_Name, Status = 'NEW')
c
c******  The first pass through the data is used to compute the conventional
```

Navy Case No. 75539

```
C****** K-NN's of each data sample in the set
C
      Do Indx = 1, MNC
        Sample_Count(Indx) = 0
      End Do Lndx = 1
      Eof_Detected = .false.
      rewind(LU_SCR)

Do While (.not. Eof_Detected)

Read (LU_SCR, Err = 10000, End = 10000)
     :    TID_1, Rec_Indx_1,
     :                (Z(Indx), Indx = 1, Udfts),
     :                ((AZ (Indx, Jndx), Indx = 1, Udfts),
     :                  Jndx = 1, Node_Def.N_Classes)
        Sample_Count(TID_1) = Sample_Count(TID_1) + 1
C
C****** The inner pass through the data for each sample of the outer loop
C
        Do Indx = 1, MNC
          Sample_Histo(Indx) = 0
        End Do
C
        Do iidx = 1, Total_Sample_Count TID_2    = Design_Set_TID (iidx)
          Rec_Indx_2 = Design_Set_Indx (iidx)
          Sample_Histo(TID_2) = Sample_Histo(TID_2) + 1
          N_Samples = Sample_Histo(TID_2)
C
C******* Compute NN Distances of samples in both inner and outer blocks
C
          NN_D = 0.0
          Do Jndx = 1, Udfts
          DZ = AZ (Jndx, TID_2) - BZ (Jndx, iidx)
            NN_D = NN_D + DZ*DZ
          End Do D_Buffer(N_Samples,TID_2) = NN_D
C
C******* Is this Leave-One-Out processing or Resubstitution or are we using
C******* an independant data set for testing
C
      If (.not. Seperate_Data_Files
     :             .and. Rec_Indx_1 .eq. Rec_Indx_2) Then
          If (L1O_Method) Then
            D_Buffer(N_Samples,TID_2) = 1.0E+10
          Else
            D_Buffer(N_Samples,TID_2) = 1.0E-10
          End If
      End If
C
      Rnk_2(N_Samples,TID_2) = Rec_Indx_2
      End Do
C
```

38

Navy Case No. 75539

```
C****** This section ranks the distances
C
      Do Indx = 1, Node_Def.N_Classes N_Samples = Sample_Histo(Indx)
         Do nndx = 1, N_Samples If (D_Buffer(nndx,Indx)  .le. 0.0)
              D_Buffer(nndx,Indx) = 1.0E+10

End Do

If (N_Samples .gt. 0) Then
           Do nndx = 1, N_Samples
             Rnk_1(nndx) = nndx
             D_Rnk_Buf(nndx) = D_Buffer(nndx,Indx)
           End Do Call Kwkud (D_Rnk_Buf, Rnk_1, N_Samples, 1)

Do nndx = 1, K
             D(nndx,Indx,Rec_Indx_1) = D_Rnk_Buf(nndx)
             jjdx = Rnk_1(nndx)
             Rnk(nndx, Indx, Rec_Indx_1) = Rnk_2 (jjdx, Indx)
           End Do D  (K+1, Indx, Rec_Indx_1) = TID_1
           Rnk (K+1,Indx, Rec_Indx_1) = TID_1

End If
      End Do

Lndx = Lndx + 1
      If (Eof_Detected) Then
10000    Print *,'K-NN Computations completed with ',
     :                    Lndx-1,' Records'
         Print *,'Before encountering an EOF condition '
                 Eof_Detected = .true.
      End If
      End Do Total_Sample_Count = Lndx - 1
C
C****** Store the   arrays 'D ' and 'Rnk '
C
      Do Indx = 1, Total_Sample_Count
         Write (LU_DNN, *)((D(ijk,kji,Indx),ijk=1, K+1),kji=1, Node
     :    _Def.N_Classes)
         Write (LU_Rnk, *)((Rnk(ijk,kji,Indx),ijk=1, K+1),kji=1, No
     :    de_Def.N_Classes)
      End Do Close (Unit=LU_SCR, Status='DELETE')
         Close (Unit=LU_DNN)
         Close (Unit=LU_Rnk)

Return
```

Navy Case No. 75539

```
        End
        Subroutine General_Monom   (Nft
    $                              ,Deg
    $                              ,FV
    $                              ,MU_GBL
    $                              ,EMN
    $                              ,Scratch
    $                              ,Xform_Type
    $                              ,Nwts
    $                              )
```

Navy Case No. 75539

```
c
c ******************************************************************************
c *                                                                              *
c *    This routine performs a monomial transformation of degree 'Deg'           *
c *    on the original sample set data.                                          *
c *                                                                              *
c *    Author: David L. Reade    (Code 3158 NWC)                                 *
c *    Date:   5/7/88                                                            *
c *                                                                              *
c ******************************************************************************
c
      Implicit         none
c
      Integer*4        Deg
      Integer*4        Nft
      Integer*4        Nrn
      Integer*4        Nwts
      Integer*4        Jndx
      Integer*4        Kndx
      Integer*4        Indx
      Integer*4        Degm1
      Integer*4        Lo_Lim
      Integer*4        Hi_lim
      Integer*4        Xform_Type
c
      Real*4           Xmlt
      Real*4           FV(1)
      Real*4           EMN(1)
      Real*4           MU_GBL(1)
      Real*4           Scratch(1)
c
      EMN(1) = 1
c
C******    Degree  0 transform
c
      If (Deg .le. 0) Return
c
C****** Degree  1 transform
c
      Degm1 = Deg - 1
      Do Indx  = 1, Nft
           Scratch(Indx) = Indx
           EMN(Indx+1)   = FV(Indx)
      End Do
c
C******    Degree 2 and higher transform
c
      If (Deg .gt. 1) Then
           Nrn = Nft + 1
           Hi_lim = Nft
           Do Indx = 1, Degm1
                Do Jndx = 1, Nft
                     Xmlt          = EMN(Jndx+1)
                     Lo_lim        = Scratch(Jndx)
                     Scratch(Jndx) = Nrn
                     Do Kndx = Lo_lim, Hi_lim
                          EMN(Nrn+1) = Xmlt*EMN(Kndx+1)
```

41

Navy Case No. 75539

```fortran
                             Nrn       = Nrn + 1
                     End Do
               End Do
               Hi_lim = Nrn - 1
         End Do
      End If
C
      If (Xform_Type .eq. 2) Then
           Do Kndx = 1, Nwts
                EMN(Kndx) = EMN(Kndx+1)
                EMN(Kndx) = EMN(Kndx) - MU_GBL(Kndx)
           End Do
      Else If (Xform_Type .eq. 0) Then
           Do Kndx = 1, Nwts
                EMN(Kndx) = EMN(Kndx+1)
           End Do
      Else If (Xform_Type .eq. 3) Then
           Do Kndx = 1, Nwts
                EMN(Kndx) = EMN(Kndx+1)
           End Do
      End If
      Return
      End
      Subroutine Selcf (FV
     $                 ,X
     $                 ,Select_Vector
     $                 ,N
     $                 )
C
C ******************************************************************
C *                                                                *
C *  This routine selects N selected features from 'FV' and puts them in *
C *  'X'. The list of selected features is in 'Select_Vector'.     *
C *                                                                *
C *  Author: David L. Reade   (Code 3158 NWC)                      *
C *  Date: 5/7/88                                                  *
C *                                                                *
C ******************************************************************
C
      Integer*4      N
      Integer*4      Indx
      Integer*4      Mndx
      Integer*4      Select_Vector(1)
C
      Real*4         X(1)
      Real*4         FV(1)
C
      Do Indx = 1, N
           Mndx = Select_Vector(Indx)
           X(Indx) = FV(Mndx)
      End Do
      Return
      End
      Subroutine Fnorm (FV
     $                 ,X
     $                 ,Mean
     $                 ,Stdev
```

Navy Case No. 75539

```
$        ,N
$        ,Bypass_Normalization
$        )
```

Navy Case No. 75539

```
C
C ***********************************************************************
C *                                                                     *
C *     This routine performs a statistical normalization on the data   *
C *   as follows:                                                       *
C *                                                                     *
C *     X(I) = (FV(I) - Mean(I))/(Stdev(I)                              *
C *                                                                     *
C *   This is done to square-up spaces between training and testing data*
C *                                                                     *
C *   Author: David L. Reade (Code 3158 NWC)                            *
C *   Date: 5/7/88                                                      *
C *                                                                     *
C ***********************************************************************
C
        Integer*4      N
        Integer*4      Indx
C
        Real*4         X(1)
        Real*4         FV(1)
        Real*4         Mean(1)
        Real*4         Stdev(1)
C
        Logical*1      Bypass_Normalization
C
        If (Bypass_Normalization) Then
              Do Indx = 1, N
                    X(Indx) = FV(Indx)
              End Do
        Else
              Do Indx = 1, N
                    X(Indx) = (FV(Indx) - Mean(Indx))*Stdev(Indx)
              End Do
        End If
        Return
        End Subroutine Kwkud(Array, Brray, N, Dir)
C
C ***********************************************************************
C *                                                                     *
C *   This is a sorting routine based on the 'QUICKSORT' technique.     *
C *   The direction is determined by the input parameter 'Dir' :        *
C *                                                                     *
C *        Dir > 0    Sort up                                           *
C *        Otherwise  Sort Down                                         *
C *                                                                     *
C * The input array to be sorted is 'ARRAY'. An associated index array  *
C *   'BRRAY' is required also. This array is an integer array.         *
C *                                                                     *
C *   Author: David L. Reade (Code 3158 NWC)                            *
C *   Date: 5/7/88                                                      *
C *                                                                     *
C ***********************************************************************
C
        Integer*2      Brray(1)
        Integer*4
```

Navy Case No. 75539

```
     $              Ltstk(25),    Rtstk(25),    Topstk,
     $              Upindx,       Dnindx,       Ltindx,
     $              Rtindx,       N,            Dir
c         Real*4
     $              Array(1),     Parelm,       Partmp, pbrtmp
c
c
      If (N .le. 1) Return
c
      Ltstk(1) = 1
      Rtstk(1) = N
      Topstk   = 1
      Do While (.not. (Topstk .eq. 0))
              Ltindx = Ltstk(Topstk)
              Rtindx = Rtstk(Topstk)
              Topstk = Topstk - 1
              Do While (.not. (Ltindx .ge. Rtindx))
                      Upindx = Ltindx
                      Dnindx = Rtindx
                      Parelm = Array((Ltindx + Rtindx)/2)
                      Do While (.not. (Upindx .gt. Dnindx))
                              If (Dir .gt. 0) Then
                                      Do While (Array(upindx)   .lt. Parelm)
                                              Upindx = Upindx + 1
                                      End Do
                                      Do While (Array(Dnindx)   .gt. Parelm)
                                              Dnindx = Dnindx - 1
                                      End Do
                              Else
                                      Do While (Array(upindx)   .gt. Parelm)
                                              Upindx = Upindx + 1
                                      End Do
                                      Do While (Array(Dnindx)   .lt. Parelm)
                                              Dnindx = Dnindx - 1
                                      End Do
                              End If
                              If (Upindx .le. Dnindx) Then
                                      Partmp = Array(Upindx)
                                      Pbrtmp = Brray(Upindx)
                                      Array(Upindx) = Array(Dnindx)
                                      Brray(Upindx) = Brray(Dnindx)
                                      Array(Dnindx) = Partmp
                                      Brray(Dnindx) = Pbrtmp
                                      Upindx = Upindx + 1
                                      Dnindx = Dnindx - 1
                              End If
                      End Do
                      If (Dnindx - Ltindx .lt. Rtindx - Upindx) Then
                              If (Upindx .lt. Rtindx) Then
                                      Topstk = Topstk + 1
                                      Ltstk(Topstk) = Upindx
                                      Rtstk(Topstk) = Rtindx
                              End If
                              Rtindx = Dnindx
                      Else
                              If (Ltindx .lt. Dnindx) Then
                                      Topstk = Topstk + 1
                                      Ltstk(Topstk) = Ltindx
```

Navy Case No. 75539

```
                        Rtstk(Topstk) = Dnindx
                  End If
                  Ltindx = Upindx
            End If
      End Do
End Do
Return
End
```
c
c ------------------------------------------------------------------------
c
```
      subroutine access_section_file integer*2      chan
      common / channl / chan integer*4      status
      integer*4      stats_lun
      integer*4      mask
      integer*4      section_length
      integer*4      addr( 2)
      integer*4      ret_addr( 2)

integer*4      sys$crmpsc
      integer*4      lib$get_lun integer*4      ufo_open
      external       ufo_open character*32   data_file_name
      CHARACTER*1    ANSWER include 'clanatr_parameters.def'
      include 'knn_global.def' print *, ' '
      print *, '==== KNN ====  KNN  ====  KNN  ===='
    :           // ' KNN  ====  KNN  ====  KNN  ====' print '( 1x, a, $)', 'Enter the communication file name: '
      read ( *, '(a)'), data_file_name c     open the communication file, make sure it exists:
      status = ufo_open ( data_file_name, knn_start_address,
    :    %loc(knn_end_address)-%loc(knn_start_address)+1)

if (status .le. 0) then
         print *, '... could not open communication file ',
    :       data_file_name
         call exit
      end if print '(1X,A,$)', 'Use Resubstitution(R) or leave 1 out (L): '
      read (*, '(a)') answer
      L10_method = Answer .eq. 'L' .or. answer .eq. 'l' return
```

Navy Case No. 75539

```
      end
C
C The following shows how to retrive the "knn_start_point" and
C the "knn_end-point":
C
C         call get_knn_start_point(ivalue)
C         print *,'knn_start_point',ivalue
C         call get_knn_end_point(ivalue)
C         print *,'knn_end_point',ivalue
C subroutine get_knn_start_point(ivalue)
      character*80 buffer
      call getenv("knn_start_point",buffer)
      read (buffer,'(i10)') Ivalue
      return
      end
      subroutine get_knn_end_point(ivalue)
      character*80 buffer call getenv("knn_end_point",buffer)
      read (buffer,'(i10)') ivalue
      return
      end
```

What is claimed is:

1. A computerized apparatus for extracting spatial frequency features in two sets of range profiles for two targets for a classification system using wavelets for digital filtering, said computerized apparatus comprising:
- a library of wavelets having shapes, coefficients and computational efficiency consistent with the dictates of an application;
- means for selecting a wavelet from said library of wavelets;
- means for selecting a scale to be used in applying said wavelet;
- means for inputing a set of analog range profiles, one set of said analog range profiles being input for each of said two targets;
- means for digitizing said analog range profiles for each of said two targets;
- an iterative digital processing means for successively and exhaustively applying each selected wavelet at each of its selected scales to digitally filter each of said two sets of digitized range profiles;
- said iterative digital processing means computing the separability of the data in each of said two sets of digitized range profiles until a wavelet and scale is identified with a calculation of maximum separability;
- a digital memory connected to said iterative digital processing means, said digital memory storing the results of said separability computations;
- an output display connected to said digital memory and said iterative digital processing means, said output display displaying results of said separability computations;
- said iterative digital processing means including:
  - means for estimating probability density from the wavelet filtered profile data;
  - means for calculating likelihood ratio from said probability density estimates;
  - means for estimating a Bayes error employing resubstitution (R) and leave-one-out (L) processing; and
  - said output display being connected to said means for estimating said Bayes error, said output display displaying the Bayes error for data processed.

2. The apparatus of claim 1 wherein the wavelets in said library are selected for inclusion by having compact support.

3. The apparatus of claim 2 wherein the wavelets selected for inclusion in said library are wavelets having coefficients between 4 and 8.

4. The apparatus of claim 1 wherein said means for inputing a set of analog range profiles is a means for receiving and storing analog profiles of said targets.

5. The apparatus of claim 1 wherein said digital processing means for applying wavelets for digital filtering includes means for convolving said wavelets with said data.

6. The apparatus of claim 1 wherein said wavelets are Daubechies wavelets.

7. The apparatus of claim 1 wherein said means for estimating probability density is a KNN estimation process.

8. A computerized method of extracting spatial frequency featured in two sets of range profile data for two targets for a classification system using wavelets, comprising the steps of:
- (1) assembling a library of wavelets having shapes, coefficients and computational efficiency consistent with the dictates of the application;
- (2) inputing a set of analog range profiles for two targets;
- (3) digitizing said analog range profiles for each of said two targets;
- (4) selecting a wavelet from said library for use as a digital filter of said digitized range profiles;
- (5) selecting a scale for use with said wavelet;
- (6) using the first wavelet from said library at the first scale, digitally filter the two sets of digitized range profile data to produce a first filtered version of the original signal in each set at the first resolution;
- (7) computing the separability of the data in the two sets of filtered range profile data and storing the results wherein said step of computing the separability of the two sets of filtered range profile data includes the steps of:
  - (a) estimating the probability density for each of the two sets of data;
  - (b) computing the likelihood ratio using said estimated probability densities; and
  - (c) estimating the Bayes error from a plot of KNN using leave one out (L) and resubstitution (R) methods;
- (8) repeating steps 4 and 5 for each scale of the first wavelet;
- (9) repeating steps 4, 5 and 6 for each wavelet in said library; and
- (10) determining the best wavelet and scale for classifying the difference between the two sets of filtered range profile data.

9. The method of claim 8 wherein said step of assembling said library of wavelets includes the step of selecting said wavelets having compact support.

10. The method of claim 8 wherein said step of assembling said library of wavelets includes the step of selecting said wavelets from Daubechies wavelets having coefficients between 4 and 8.

* * * * *